United States Patent [19]
Kilian et al.

[11] Patent Number: 5,495,532
[45] Date of Patent: Feb. 27, 1996

[54] SECURE ELECTRONIC VOTING USING PARTIALLY COMPATIBLE HOMOMORPHISMS

[75] Inventors: Joseph J. Kilian, Princeton Junction, N.J.; Kazue Sako, Kanagawa, Japan

[73] Assignees: NEC Research Institute, Inc., Princeton, N.J.; NEC Corp., Tokyo, Japan

[21] Appl. No.: 293,363

[22] Filed: Aug. 19, 1994

[51] Int. Cl.$^6$ ............... H04L 9/30; H04L 9/00; G06F 17/60

[52] U.S. Cl. ............... 380/30; 380/23; 380/25; 380/28; 380/49; 364/409

[58] Field of Search ............... 380/23, 25, 28, 380/30, 46, 49, 50; 364/409

[56] References Cited

U.S. PATENT DOCUMENTS 5,412,727  5/1995  Drexler et al. ............... 380/23 X

OTHER PUBLICATIONS

Josh Daniel Cohen Benaloh, Verifiable Secret–Ballot Elections. PhD thesis, Yale University, 1987. YALEU/DCS/TR–561.

Josh C. Benaloh and Dwiht Tuinstra, Receipt–Free Secret–Ballot Elections. STOC 94, 1994, pp. 544–553.

David Chaum, Untraceable Electronic Mail, Return Addresses, and Digital Pseudonyms, Communications of the ACM, vol. 24, No. 2, Feb. 1981.

Matthew Franklin and Moti Yung, Communication Complexity of Secure Computation. STOC 92, 1992, pp. 699–710.

Choonsik Park, Kazutomo Itoh and Kaoru Kurosawa, Efficient Anonymous Channel and All/Nothing Election Scheme. EUROCRYPT '93, 1993, pp. 248–259.

Josh D. Cohen and Michael J. Fischer, A Robust and Verifiable Cryptographically Secure Election Scheme. FOCS85, 1985, pp. 372–382.

Kaoru Kurosawa and Shigeo Tsujii, Multi–Language Zero Knowledge Interactive Proof Systems, Advances in Cryptology–Crypto '90, (1991), pp. 339–352.

Amos Fiat and Adi Shamir, How to Prove Yourself: Practical Solutions to Identification and Signature Problems. Advances in Cryptology–Crypto '86, Springer–Verlag, 1986, pp. 186–199.

Joan Boyar, Gilles Brassard, Rene Peralta. Subquadratic Zero–Knowledge, FOCS 91, 1991, pp. 69–78.

Joe Kilian, A Note on Efficient Zero–Knowledge Proofs and Arguments. STOC 92, 1992, pp. 722–732.

A. Fujioka et al, A Practical Secret Voting Scheme for Large Scale Elections, Advances in Cryptology–Auscrypt '92, pp. 244 to 251.

J. Benaloh et al. Distributing the Power of a Government to Enhance the Privacy of Voters, ACM Symposium on Principles of Distributed Computing, 1986, pp. 52 to 62.

*Primary Examiner*—Bernarr E. Gregory
*Attorney, Agent, or Firm*—Philip J. Feig

[57] ABSTRACT

A number-theoretic based algorithm provides for secure electronic voting. A voter may cast a votes among n centers in a manner which prevents fraud and authenticates the votes. Preprocessing allows for nearly all of the communication and computation to be performed before any voting takes place. Each center can verify that each vote has been properly counted. The algorithm is based on families of homomorphic encryptions which have a partial compatibility property. The invention can be realized by current-generation PCs with access to an electronic bulletin board.

28 Claims, 10 Drawing Sheets prove±1$(x_1, x_2)$ /* Given $E_1(x_1), E_2(x_2)$, prove that $$x_1 + x_2 \in \{1, -1\} \bmod q \; */$$

1. The prover uniformly chooses $r \in Z_q$ and $s \in \{1, -1\}$, and computes $R = H(r)$, the secure commitment for $r$. The prover then computes $$Y_1 = E_1(s(x_1 + r)) = (E_1(x_1)E_1(r))^s \text{ and}$$

$$Y_2 = E_2(s(x_2 - r)) = (E_2(x_2)E_2(r)^{-1})^s,$$

and posts $(Y_1, Y_2, R)$.

2a. With probability $\frac{1}{2}$, the verifier asks the prover to reveal $r$ and $s$. The verifier checks that $r$ is consistent with $R$ and that the above identities for $Y_1$ and $Y_2$ hold.

2b. With probability $\frac{1}{2}$, the verifier asks the prover to reveal $s(x_1 + r)$ and $t = s(x_1 + r) + s(x_2 - r) \in \{1, -1\}$. The verifier then checks that $Y_1 = (E_1(x_1)E_1(r))^s$ and that $Y_2 = E_2(t - s(x_1 + r))$.

Figure 1 prove-sum$\left(X^{(1)}, \ldots, X^{(n)}, A, B\right)$
/* Given $E_1\left(X^{(1)}\right), \ldots, E_n\left(X^{(n)}\right), E_a(A), E_b(B)$, prove that $X^{(1)} + X^{(2)} + \cdots X^{(n)} = A + B$ */

1. For $0 \le k \le n$ the prover uniformly chooses $r_i \in Z_q$. The prover computes the commitment $R_i = H(r_i)$ and computes $Y_1, \ldots, Y_n, Y_a, Y_b$ by $$Y_i = E_i\left(X^{(i)} + r_i\right) \text{ for } 1 \le i \le n,$$
$$Y_a = E_a(A + r_0) \text{ and}$$
$$Y_b = E_b(B + \left(\sum_{i \ge 1} r_i\right) - r_0).$$

The prover posts $R_1, \ldots, R_n$ and $Y_n, Y_a, Y_b$.

2a. With probability $\frac{1}{2}$, the verifier challenges the prover to reveal $r_0, \ldots, r_n$. The verifier checks that $$R_i = H(r_i) \text{ for } 1 \le i \le n,$$
$$Y_i = E_i\left(X^{(i)}\right) E_i(r_i) \text{ for } 1 \le i \le n,$$
$$Y_a = E_a(A) E_a(r_0), \text{ and}$$
$$Y_b = E_b(B) E_b\left(-r_0 + \sum_{i=1}^{n} r_i\right).$$

2b. With probability $\frac{1}{2}$, the verifier challenges the prover to reveal $(A + r_0)$, $(B - r_0 + \Sigma_{i=1}^{n} r_i)$ and $(X^{(i)} + r_i)$ for $1 \le i \le n$. The verifier checks that $$Y_i = E_i\left(X^{(i)} + r_i\right) \text{ for } 1 \le i \le n,$$
$$Y_a = E_a\left(A + r_0\right) = \alpha_a^{(A+r_0)} \text{ and}$$
$$Y_b = E_b(B + \left(\sum_{i \ge 1} r_i\right) - r_0) = \alpha_b^{(B+(\Sigma_{i=1}^{n} r_k)-r_0)}.$$

Finally, the verifier checks that $$\sum_{i=1}^{n}\left(X^{(i)} + r_k\right) = (A + r_0) + \left(B - r_0 + \sum_{i=1}^{n} r_i\right).$$

Figure 2

$m$ votes $n$ centers Election Scheme

Precomputation (In the following description, $i$ ranges over $1, \ldots, n$, $j$ ranges over $1, \ldots, m$, and $k$ ranges over the indices of all valid voters $V_k$.)

1. The vote counters $C_1, C_2, \ldots, C_n$ agree on a randomly selected family of partially compatible encryption functions, $E_a, E_b, \{E_i\}$ and post them.

2. Each voter $V_k$ randomly chooses a "masking vote" $v_{k,j} \in \{1, -1\}$ and then randomly chooses two representations for $v_{k,j}$, $$v_{k,j} = X_{k,j}^{(1)} + X_{k,j}^{(2)} + \cdots + X_{k,j}^{(n)} = A_{k,j} + B_{k,j}.$$

The verifier posts $E_i(X_{k,j}^{(i)})$, $E_a(A_{k,j})$ and $E_b(B_{k,j})$.

3. $V_k$ executes the reduction described in conjunction with eq. (1) and obtains a single equation $$\bar{X}_k^{(1)} + \bar{X}_k^{(2)} + \cdots + \bar{X}_k^{(n)} = \bar{A}_k + \bar{B}_k,$$

equality of which implies that the given two representations of masking vote $v_{k,j}$ are equal for all $j$. $V_k$ then proves the validity of the equation using prove-sum.

4. $V_k$ executes protocol prove±1 to show that $A_{k,j} + B_{k,j} \in \{1, -1\}$ for all $j$.

5. $V_k$ encrypts $X_{k,j}^{(i)}$ using $C_i$'s public encryption algorithm, for all $j$ and $i$, and posts the encryptions.

Vote Casting

1. To use the $j$th vote, voter $k$ computes $s_{k,j} \in \{-1, 1\}$ such that his actual vote is equal to $s_{k,j}v_{k,j}$, and posts $j$ and $s_{k,j}$. Note that often $j$ is known and thus need not be sent. Assume that the correct $j$ for each voter is known, and henceforth drop $j$ from the notation.

Vote Counting

1. Each center $C_i$ decrypts $X_k^{(i)}$ for all $k$ and $j$, and verifies whether it is consistent with $E_i(X_k^{(i)})$. The center calculates the subtally $t^{(i)} = \sum_k s_k \cdot X_k^{(i)}$ and posts $t^{(i)}$.

2. Each person checking the vote verifies that $\Pi_k(E_i(X_k^{(i)}))^{s_k}$ is equal to $E_i(t^{(i)})$. If so, they accept $\sum_i t^{(i)}$ as the tally of the vote.

If precomputation is not used, then $v_k$ can be used as the actual vote and $s_k$ is omitted.

SECURE ELECTRONIC VOTING USING PARTIALLY COMPATIBLE HOMOMORPHISMS

FIELD OF THE INVENTION

The present invention relates to method and apparatus useful for secure electronic voting and specifically, to number-theoretic based algorithms for secure electronic voting. Quite specifically, the algorithms are based on families of homomorphic encryptions having a partial compatibility property.

BACKGROUND OF THE INVENTION

Secure electronic voting is one of the most important single applications of secure multi-party computation. Yet despite extensive work on this subject, no complete solution has been found in either the theoretical or practical domains. Even the general solutions to secure multi-party protocols fail to exhibit all of the desired properties of elections. For example, an article by J. C. Benaloh et al, entitled "Receipt-free Secret-ballot Election," in STOC 94, pp. 544–553 (1994) describes the receipt-free property. While these general solutions do have a wide breadth of security properties, and some hope of rigorous analysis, they are impractical both in their computational and communication costs.

A number of more practical voting protocols have been proposed, with widely differing security properties. Schemes based on anonymous channels/mixers have become very popular due to their superior efficiency and the arbitrary nature of the votes that are allowed. Such schemes are described in an article by D. Chaum entitled "Untraceable Electronic Mail, Return Address, and Digital Pseudonyms" in Communication of the ACM, ACM, 1981, pp 84 to 88, in an article by A. Fujioka et al, entitled "A Practical Secret Voting Scheme for Large Scale Elections," in Advances in Cryptology—Auscyrpt '92, 1992, pp. 244 to 251, and in an article by C. Park et al, entitled "Efficient Anonymous Channel and All/Nothing Election Scheme" in Advances in Cryptology, Eurocrypt '93, 1993, pp. 248 to 259. However, a price is paid for this efficiency. The simplest of these schemes does not allow a voter to securely protest the omission of a vote without allowing a malicious voter to block the election. In all the schemes known to the inventors there is a high round complexity—one round for each mixer used to implement the anonymous channel. Also, after the election each voter is typically responsible for checking that their vote was correctly tallied. There is usually no way for an outside observer to later verify that the election was properly performed. Another approach is the use of number theoretic techniques without anonymous channels or mixers. The protocol has desirable security properties, but as discussed below in detail, their communication complexity is quite high for realistic scenarios. Such techniques are described in an article by J. Benaloh and M. Yung entitled "Distributing the Power of a Government to Enhance the Privacy of Voters" in ACM Symposium on Principles of Distributed Computing, 1986, pp. 52 to 62, in a Ph.D. thesis by J. Benaloh entitled "Verifiable Secret-Ballot Elections" Ph.D. thesis Yale University 1987 Yaleu/DCS/TR-561, and in an article by J. Cohen et al entitled "A Robust and Verifiable Cryptographically Secure Election Scheme", in FOCS85, 1985, pp. 372 to 382.

The protocol of Benaloh and Yung enjoys most of the desirable security properties obtained in the present invention, and is based on partially compatible homomorphisms of the form $E_i(x) = y_i^x \cdot g_i^r \mod n_i$. The technical advances made by the present invention include:

Greater generality: The encryption used by Benaloh and Yung was tuned to the factoring problem. Each center i had the prime factorization of $n_i$ as part of its secret information. This secret information complicated the protocol in that the voters needed to verify the correctness of the centers' public information and the correctness of their subtallies through interactive protocols. Also, the present invention can be applied to "discrete-log type" problems.

Amortization techniques: Unlike most previous work in voting, the present invention considers how to run multiple elections more efficiently. Since there are usually many voters and checking each vote involves many subchecks, amortization techniques can be effectively used to speed up single elections as well.

Improved zero-knowledge proofs: Direct and efficient protocols show, for example, that $x+y$ is either 1 or −1, without conveying which is the case. These proofs are more efficient than the cryptographic capsule methods used in the prior art.

Also, the present invention incorporates techniques, such as the Fiat-Shamir heuristic for removing interaction, that were not available at the time of Benaloh and Yung. Some of these techniques can also be applied to the original protocol (with varying degrees of difficulty and utility). By using more modern techniques the present invention realizes the basic approach laid out by Benaloh and Yung, but with greatly improved efficiency.

In accordance with the teaching of the present invention, a number-theoretic method for secure electronic voting provides a number of features including moderate communication cost, low round complexity, preprocessing potential, security, universal verifiability and flexibility, all as described below.

SUMMARY OF THE INVENTION

The idea of secure electronic, voting is to enable secret votes to be performed electronically where the votes of individual voters are unknown and where the election results are tamper-proof without the collusion of many counting centers. The present invention relies upon a novel mathematical method to encode votes for verification by breaking up the vote into shares which are supplied to different counting centers. Moreover, the ballots can be pre-processed for verification, but the ultimate vote decision can be delayed until the time of actual voting. The method used permits authentication of multiple ballots efficiently. In addition, the method is readily embodied using currently available PCs or workstations and conventional electronic bulletin boards.

The present invention requires much less communication cost than the previous number-theoretic protocols. For one realistic setting of the parameters, it is estimated that present invention conservatively requires less than 1/20th the communication of Benaloh-Yung's scheme. Furthermore, when more than one election is to be held, it is possible to use an amortization technique that will boost the per-vote advantage to a factor of between 150 and 250. It should be noted however that the communication complexity of each vote remains much greater than that required by the anonymous channel/mixer-based protocols. However, it is well within the range of feasibility.

The present method enjoys an extremely low round complexity. Once the system has been set up, a voter can cast a vote in an election simply by posting single message. The counting process comprises each counting center posting single, very short message.

Ideally, one would like to do the bulk of the communication and computation in advance of an actual vote. In the present method, it is possible to preprocess ones vote with a single message. This preprocessing step does not depend on the vote that is eventually cast, and may be done at the time the voter "registers" to vote. When it comes time to actually vote, the voter can often simply post a single bit (or a bit along with a small integer in the worst case). Thus even with the signatures needed for identification, the communication cost is negligible. Similarly, after preprocessing, a PC acting as a voting center can easily count a hundred incoming votes per second.

Under reasonable heuristic assumptions, no coalition of voters or centers can unfairly influence an election or significantly,delay its outcome. A voter keeps her vote private as long as two of the centers are honest. The two honest centers requirement can be reduced to a single honest center requirement by a simple doubling mechanism: each center simulates two centers of the original schemes.

While heuristic assumptions are used (such as the Fiat-Shamir method for noninteractive proofs) the only attack known requires one to compute discrete-logarithms over the group being worked in. Thus, it is possible to use elliptic curves fox which the discrete-log problem is currently thought to be much harder than factoring. Previous number-theoretic approaches were based on the rth residue problem over $Z_n^*$, and are guaranteed breakable if one can factor n.

Every action by a voter, whether preprocessing a vote or actually voting, is accompanied by a proof that the ballot is correctly constructed. The output of the counting center may also be easily checked for correctness. Any participant can verify that everyone else's vote has been included in the tally. Once a party posts a message, it does not need to cooperate in the checking of its work. The checking of the election can be distributed over many parties, and if someone is still not satisfied they may check the results themselves. Thus, a voter has the option of minimally participating in an election by simply sending in their vote and then ceasing all involvement.

The present invention is readily adaptable to different situations. For example, the number of centers can be made quite large. Voters may choose their own security/efficiency tradeoff and individually choose how many and which centers they use. Thus, it is possible to practically support an election in which there are a 100 centers of which a typical voter chooses 10 and is protected as long as two of them are honest. For large elections it is possible to construct hierarchical counting schemes.

The present invention provides a new tool: families of partially compatible homomorphic encryption functions. There are well known encryption functions with additive $(E(x+y)=E(x)E(y))$ or multiplicative $E(xy)=E(x)E(y)$ homomorphisms. These properties can be exploited to make very efficient zero-knowledge proofs, but they can also work against security. For example, suppose that one has $E(x)$ and $E(y)$ and wishes to know whether $x+y$ is 1 or $-1$. If E is a function (as opposed to a probabilistic encryption) with an additive homomorphism then one can compute $E(x+y)$ and check if it is equal to $E(1)$ or $E(-1)$.

Benaloh and Yung in their article entitled "Distributing the Power of a Government to Enchance the Privacy of Voters" in ACM Symposium on Principles of Distributed Computing, 1986, pages 52 to 62. circumvent this difficulty by using a family of probabilistic encryption functions, $\{E_1, \ldots, E_n\}$. Each $E_i$ probabilistically encrypts an element $x \in Z_r$, where r is a moderately large prime independent of i. While each $E_i$ satisfies $E_i(x+y)=E_i(x)E_i(y)$, there is no obvious way of combining $E_i(x)$ and $E_j(y)$ to obtain an encryption of some simple function of x and y. A key requirement of their technique was that the encryptions $E_i$ be probabilistic, a condition weakened in the formalism below.

The present invention considers a family of additive homomorphic, possibly deterministic encryption functions, $\{E_1, \ldots, E_n\}$. Within this family there is a single group $Z_q$ (where q is large) such that $E_i(x+y)=E_i(x)E_i(y)$, where $x,y \in Z_q$. Thus, they are all basically compatible. However, it is required that for all (i,j) the following two distributions are computationally indistinguishable:

1. $(E_i(x),E_j(y))$, where x and y are chosen uniformly from $Z_q$, and

2. $(E_i(x),E_i(x))$, where x is chosen uniformly from $Z_q$.

This implies that for any v, $(E_i(x),E_j(v-x))$ is indistinguishable from $(E_i(x), E_j(y))$. Thus, if x and y are chosen uniformly such that $x+y=v$, then knowing $(E_i(x),E_j(y))$ does not reveal anything about v. Similarly, if $x_1, \ldots, x_n$ are chosen uniformly to stun to v, then knowing $n-2$ of the values $\{x_1, \ldots, x_n\}$ reveals nothing about v.

Such families of called encryption functions with this property partially compatible homomorphic encryption functions. Reduction of the existence of such families to any well-known algebraic assumption is unknown. However, there are a number of candidates for such a family of encryption functions. For example, let primes $p_i=k_iq+1$, where q is a prime, let $g_i$ be a randomly (or pseudorandomly) chosen generator for $Z_{pi}^*$ and let $\alpha_i=g_i^{k_i}$. If $E_i(x)=\alpha_i^x$ then there is no way of obtaining any information about $x_1+x_2$ given $E_1(x_1)$ and $E_2(x_2)$ without computing discrete logarithms. The only weakness of the method is that if $p_1=p_2$ and 1 is such that $\alpha_2=\alpha_1^l$ is known, then one can compute $E_1(x_1+x_2)^l = E_1(x_1)_l E_2(x_2)$, which allows one to determine if $x_1+x_2$ is equal to a given number. No such attack is known when $p_1 \neq p_2$.

It is also possible to incorporate encryption functions based on elliptic curves or other groups. Furthermore, it is possible to mix arbitrarily which types of groups are used. For ease of description, multiplicative notation for the cyclic group generated by $\alpha_i$ will be used, regardless if the group is normally treated as multiplicative or additive.

Using these families of partially compatible homomorphic encryption functions, very efficient interactive proofs for assertions are constructed such as:

$x_1+ \ldots +x_n=a+b$, given the encryptions for these values, and $x+y \in \{1,-1\}$, given the encryptions for x and y.

Because of the efficiency of these proofs, it can be run many times, and used with the heuristic of Fiat-Shamir described in an article entitled "How to Prove Yourself: Practical solution to identification and signature problems" in Advances in Cryptology—Crypto '86, Springer-Verlag, 1986, pp. 186 to 199 to make them noninteractive.

The improved proof methods bring the complexity of the number-theoretic techniques to the point where they can be used by a personal computer (PC) that can post messages to a bulletin board as will be described below. However, when very strong confidence parameters are used ($2^{-40}$ or even $2^{-60}$ error rates are recommended when using the Fiat-Shamir heuristic) and the voter is allowed to protect the vote by using many (e.g., 10) of the available centers, the costs are at the outer margin of usability. Hence, the invention develops methods for making these burdens easier to bear.

By allowing nearly all of the work to be done in advance of any election, the computational and communication burden can be amortized over a much larger period of time and still result in having very fast elections. To lower the computational burden of a proof, table lookup techniques are used to reduce the number of group operations required. Finally, a voter can process many votes using much less communication and computation than would be required to process the votes individually.

The use of amortization in cryptography is not new. Kurosawa and Tsujii in an article entitled "Multi-language Zero Knowledge Interactive Proof Systems" in Advances in Cryptology—Crypto '90 (1991) pp. 339 to 352, construct a zero-knowledge proof for two assertions that is more efficient than simply concatenating the zero-knowledge proofs for each assertion. Boyar, Brassard and Peralta in an article entitled "Subquadratic Zero-Knowledge" in FOCS 91 (1991) pages 69 to 78, and Kilian in an article entitled "A Note on Efficient Zero-knowledge Proofs and Arguments" in STOC92 (1992) pages 722 to 732, consider the problem of achieving ultra-high confidence zero-knowledge proofs for NP using less communication than is required by simple sequential repetition. Franklin and Yung in an article entitled "Communication Complexity of Secure Computation" in STOC92 (1992) pages 699 to 710, show how to implement k instances of a secure multiparty computation much less expensively than k times the cost of a single secure computation.

The present invention therefore provides a method and apparatus for secure electronic voting using partially compatible homomorphisms which is more efficient than the heretofore known methods.

The invention will be more clearly understood when the following description is read in conjunction with the accompanying drawing.

BRIEF DESCRIPTION OF THE DRAWING

FIG. 3 is an algorithm of the electronic scheme comprising the present invention;

DETAILED DESCRIPTION OF THE INVENTION

The basic voting scheme comprising the present invention will now be described. For simplicity, assume that there are only two centers counting the votes, and that a single yes/no vote is being held. It will be apparent to those skilled in the art that the invention is applicable to situations with many, for example tens, vote counting centers. The basic method does not protect privacy of a vote against the center. This problem will be overcome as described below when more than two centers are involved.

The two centers are denoted by $C_1$ and $C_2$. Each vote v will be broken into shares $x_1$ and $x_2$, where $x_i$ is a member of $Z_q$, and q is a prime. Before being posted, each share $x_i$ is encrypted using encryption function $E_i$, where $\{E_1, E_2\}$ form a family of partially compatible homomorphic encryption functions.

As part of the setup process, which need only be done once for all time, the parties agree on $\{E_1, E_2\}$. Note that with implementations based on discrete-log functions, there is no trapdoor information that need be kept hidden. Thus, for example, a few bits from some global source can be fed into a pseudorandom bit generator and these random bits could be used to choose the moduli and generators needed to specify the desired functions. Heuristically, anyone can provide the seed to the pseudorandom generator, and it is unlikely that the seed will make the output a weak set of functions.

Along with setting up the family of encryption functions, assume that basic primitives such as public-key cryptography and secure bit-string commitment have already been established. Let $H(x)$ denote a possibly probabilistic hash function that commits the sender to x without giving away any useful information about x.

The basic election procedure is performed in three stages: vote preparation, vote casting and vote counting.

Each voter i chooses a vote $v_i$, 1 for a yes-vote and −1 for a no-vote. The voter uniformly generates $x_i^{(1)}$ and $x_i^{(2)}$ such that $$x_i^{(1)} + x_i^{(2)} = v_i \bmod q.$$

The voter then posts $E_1(x_i^{(1)}) = \alpha_1^{x_i(1)}$ and $E_2(x_i^{(2)}) = \alpha_2^{x_i(2)}$ and proves $x_i^{(1)} + x_i^{(2)} \in \{1, -1\}$ without disclosing $x_i^{(1)}$, $x_i^{(2)}$ nor $v_i$.

Each voter i encrypts $x_i^{(1)}$ and $x_i^{(2)}$ using the public keys of $C_1$ and $C_2$ respectively. Each center j computes $E_j(x_i^{(j)})$ and checks that it agrees with the previously posted value.

Each center j sums up $x_i^{(j)}$ modulo q for all voters i and posts sub-tally, $t_j$. Each voter verifies that $$E_j(t_j) = \prod_j E_j(x_i^{(j)}),$$

and computes $T = t_1 + t_2$, which is equal to the number of "yes" votes minus the number of "no" votes.

Figure 1:
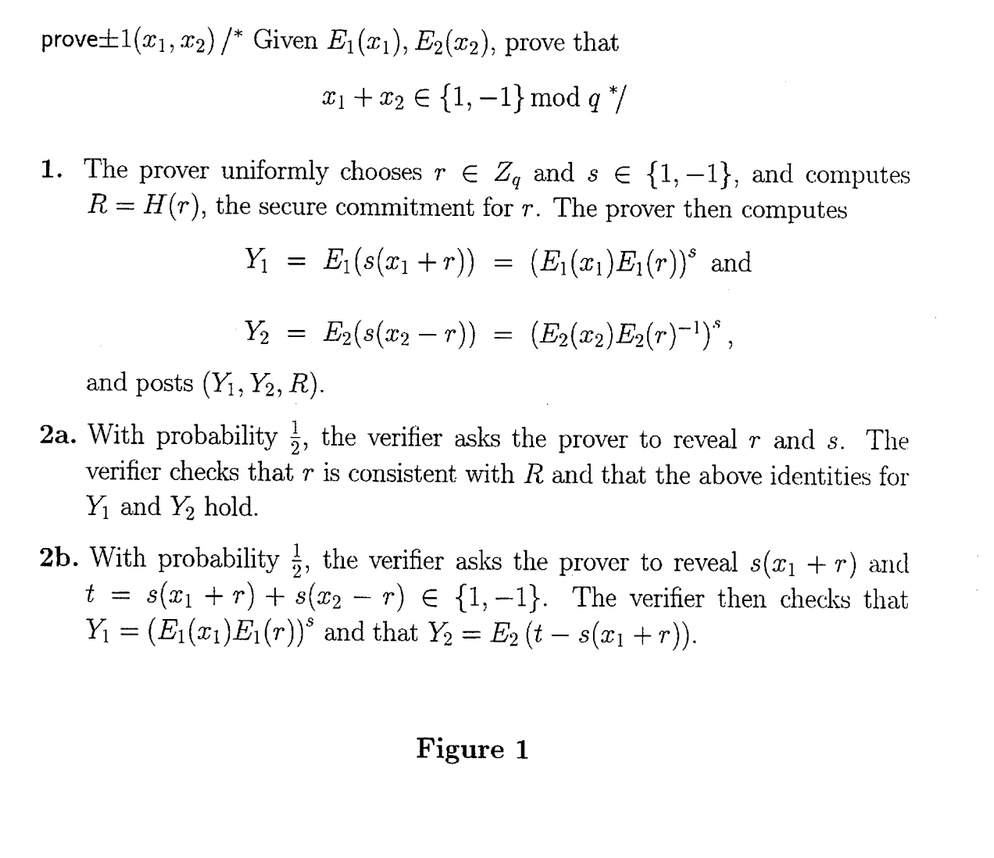
FIG. 1 is an algorithm useful for proving the validity for shares.

Referring to FIG. 1 there is shown a simple algorithm, referred to as prove±1, for proving validity of shares, namely that $x_1 + x_2 \in \{1, -1\} \bmod q$ given $E_1(x_1)$ and $E_2(x_2)$. The algorithm is a method by which a verifier proves that when the halves of the votes are combined, the result is a well-formed vote. No information regarding the actual vote is revealed by the method.

Each execution of the algorithm in FIG. 1 will catch a cheating prover with probability ½. Note that the distribution of $(Y_1, Y_2)$ is easy to simulate given $(E_1(x_1), E_2(x_2))$. Indeed, if R is a perfect zero-knowledge bit commitment then the algorithm is perfect zero-knowledge. Also note that a conceptually more simple algorithm would have the prover reveal $s(x_2 - r)$ in Step 2b. The selected algorithm was chosen for its reduced communication complexity. Both s and t could also be eliminated by having the verifier check both possibilities, but this would save only 2 bits.

While this algorithm is given in terms of a verifier, a more round efficient solution is to use the Fiat-Shamir method of eliminating interaction. First, the protocol is run many times (on the order of 40 or 60) in order to make the probability of withstanding all of the challenges vanishingly small. Then the verifier is replaced by a suitably "random looking" hash function which generates the challenges from the prover's posting in Step 1 of the protocol. If the prover is trying to prove an incorrect statement, then heuristically the prover's only strategy is to run different postings through the hash function until finding one whose challenges the prover can meet. However, the cost of this attack is prohibitive if the error probability is truly small ($2^{-40}$ or $2^{-60}$).

In the basic method described above, there were only two centers and a single yes-no vote. However, in more practical scenarios a voter will want to divide the vote among as many centers as possible - the more centers the more private the vote. Also, a voter is likely to participate in many elections and a given election is likely to have many yes/no votes. For example, Benaloh supra points out that approval voting (where a voter may cast a vote for any number of the given candidates) is really just a case of several independent yes/no votes. The following describes how to split many votes over many centers with substantial amortized savings compared with preparing each vote separately.

For simplicity, assume that there are only n centers and that each voter will split their votes over all n centers. For each center i there is an encryption function $E_i$ from this family. Following the basic scheme, the voter breaks the vote $v \in \{1, -1\}$ into shares $X^{(1)}, \ldots, X^{(n)}$ such that $v = X^{(1)} + \ldots + X^{(n)}$, and then proves that these shares are correctly constructed. The most straightforward solution is to adapt the algorithm prove±1 shown in FIG. 1 to handle more than two shares. Instead, the proof is broken into two stages. First, the prover randomly generates a, b such that $v = a+b$ and proves that $X^{(1)} + \ldots + X^{(n)} = A+B$. Then, the algorithm prove±1 in FIG. 1 is used to prove that $v = a+b$. This provides an opportunity to handle multiple votes efficiently as described below.

Figure 2:
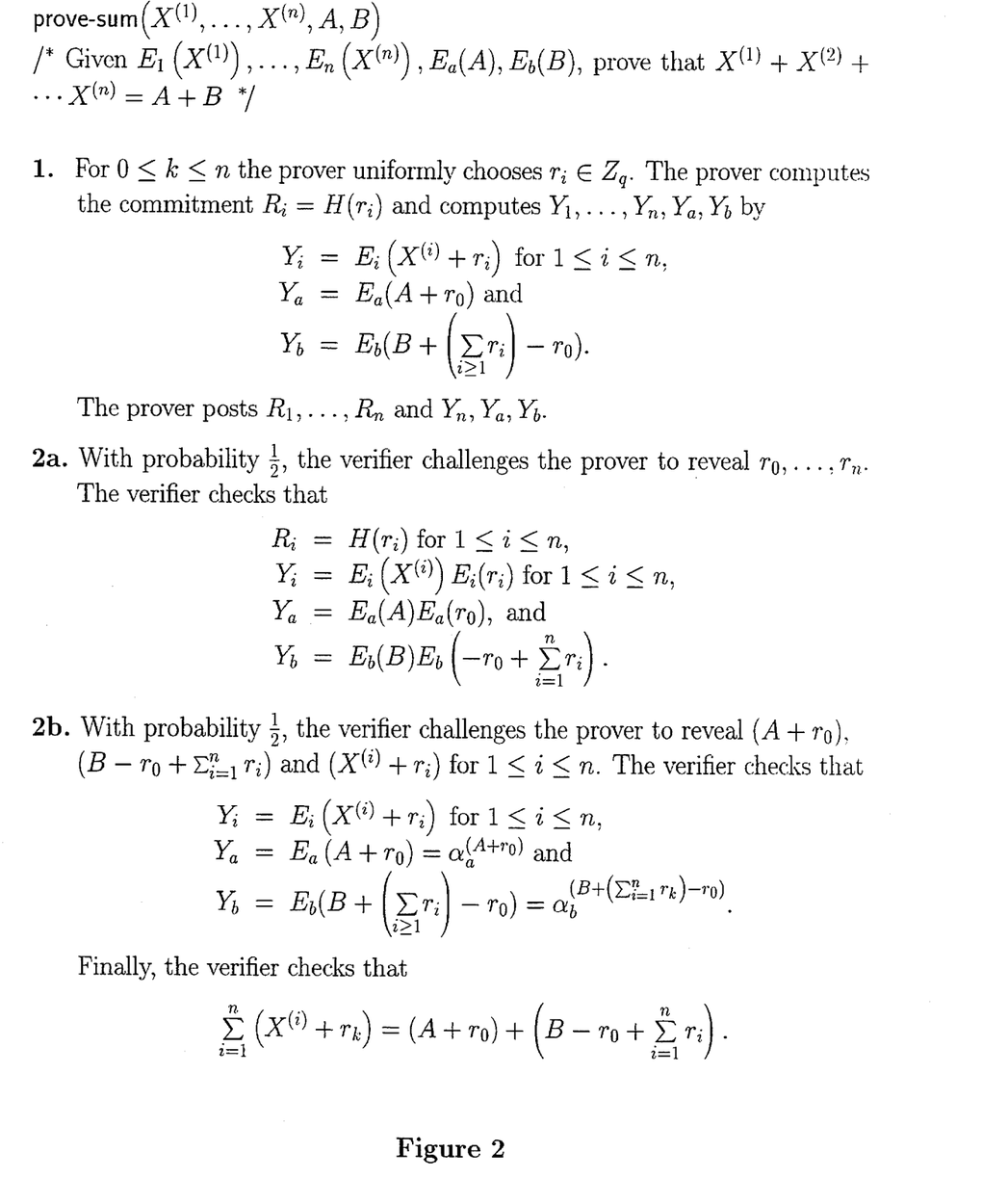
FIG. 2 is an algorithm useful for proving summation assertions.

FIG. 2 is an algorithm, referred to as prove-sum, for reducing a sum of n encrypted shares to a sum of two shares. The voter has broken the vote into many encrypted shares and also split the vote into two encrypted halves. The prove-sum algorithm is a method by which a verifier proves that the many shares combine to give the same value as the two halves. No information regarding the actual vote is revealed by the method. The algorithm prove-sum is used in conjunction with the algorithm prove±1 to efficiently show that vote which has been broken into many shares can be combined into a well-formed vote.

Assume that the encryptions $E_i(X^{(i)})$, $E_a(A)$ and $E_b(B)$ are known, and that $$(E_1, \ldots, E_n, E_a, E_b)$$

is a family of partially compatible homomorphic encryptions with domain $Z_q$. If the summation assertion is not true, then in each iteration of the protocol the prover will fail a check with probability at least ½. As before, this error rate is lowered to a very small value by repeated repetition, and then the Fiat-Shamir heuristic is used to make the proof noninteractive.

The bulk of computation and communication required for the full n-party scheme is taken up by the proof of the reduction to the 2-share stun. By combining many of these proofs into a single proof, the voter can efficiently prepare many "yes/no" ballots at once with significant savings in the amortized computation and communication required.

Suppose that the voter wants to prove that the following equations hold.

$$X_1^{(1)} + X_1^{(2)} + \ldots + X_1^{(n)} = A_1 + B_1$$

$$X_2^{(1)} + X_2^{(2)} + \ldots + X_2^{(n)} = A_2 + B_2$$

$$\vdots$$

$$X_m^{(1)} + X_m^{(2)} + \ldots + X_m^{(n)} = A_m + B_m$$

and the values of $E_i(X_j^{(i)})$, $E_a(A_j)$ and $E_b(B_j)$ are known for $1 \leq i \leq n$ and $1 \leq j \leq m$. Let coefficients $c_1, \ldots, c_m \in Z_q$ be chosen at random, and consider the following linear equation:

$$X^{(1)} + X^{(2)} + \ldots X^{(n)} = A + B, \text{ where} \quad (1)$$

$$X^{(i)} = \sum_{j=1}^{m} c_j X_j^{(i)}$$

$$A = \sum_{j=1}^{m} c_j A_j \text{ and}$$

$$B = \sum_{j=1}^{m} c_j B_j.$$

By a simple probability argument, the following facts hold:

1. If all of the original linear equations were true, then the new linear equation will also be true, and
2. If at least one of the original linear equations is false, then the new linear equation will be false with probability $1-1/q$.

Thus, a proof of the new equation will suffice as a proof of all of the original equations.

It remains to show how to generate the encryptions for the new variables and how to choose the coefficients. The encryptions are given by $$E_i(\overline{X}^{(i)}) = \prod_{j=1}^{m} E_i(X_j^{(i)})^{c_j}$$

$$E_a(\overline{A}) = \prod_{j=1}^{m} E_a(A_j)^{c_j} \text{ and}$$

$$E_b(\overline{B}) = \prod_{j=1}^{m} E_b(A_j)^{c_j}.$$

One can view the $c_i$ coefficients as challenges. As before, the Fiat-Shamir scheme is used to generate the value $c_i$ by a hash function of the original encryptions. Note that in this case, it is not necessary to perform the operation multiple times, since for a random setting of the coefficients an error in the original set of equations will result in an error in the final equation with all but vanishing probability. Indeed, for computational efficiency it suffices to choose $c_i$ from $\{1 \ldots 2^{60}\}$, which will greatly speed up the exponentiations.

FIG. 3 is an algorithm of the election method comprising the present invention as described above for the case of m votes distributed over n centers. In the precomputation stage, randomly generated votes are broken into encrypted shares. In the vote-casting stage, the voters specify whether the random vote should be counted as given or be inverted, i.e. changed from a yes (1) to a no (−1) or vice-versa. In the vote counting stage, the voting centers count their shares of the vote and post the subtallies. The subtallies do not provide any information for any subset of the voters. The subtallies are then combined together to determine the final vote. At each step of the algorithm, information is provided to allow voters and (possibly future) outside observers to verify the correctness of each step.

An estimate of the communication cost of the present invention will be calculated. While it will be apparent to those skilled in the art that there are many possible variations of the present invention, a good understanding of their complexity can be had by analyzing the cost of splitting a vote into encrypted shares and proving that the shares are well formed.

A number of security parameters are involved in this analysis. First, assume that the encryption functions are based on modular exponentiation over $Z_{p_i}^*$, and let k be an upper bound on the length of $p_i$ (if different moduli are used, then they will not be exactly the same size). Let h be the output of the hash function H used for commitments and let l be the security parameter that effectively denotes how many times the proofs are run.

Consider the most general case of splitting m votes to n centers. Note that for m large, a higher amortized efficiency is achieved due to the method used. Not counting the cost of the proof, representing these pieces along with the additional 2 shares used in the reduction requires (n+2)km bits. The cost of proving the correctness of the combined equation [2(n+2)k+(n+1)h]l bits. At this point, the voter has proved that each set of n shares representing a vote is equal to the two auxiliary shares. The proof that the two auxiliary shares sum to 1 or −1 costs [3k+h]lm bits. The cost of revealing these shares to the proper counting authorities is approximately nkm bits. Altogether, this gives a total of 2(n+1)mk+[(2n+2)k+(n+1)h+(3k+h)m]l bits. Some of the resulting numbers are shown in Table 1. If "center doubling" is used so as to require only one good center instead of two, then the costs are all doubled.

TABLE 1

|  | 1 vote, l = 40 | 1 vote, l = 20 | 100 votes, l = 40 |
|---|---|---|---|
| Proposed Scheme | 56K bytes 2.5 min. | 28K bytes 1.5 min | 1M bytes 58 min. |
| Benaloh & Yung (1000 voters) | 4M bytes 11 min | 1M bytes 3 min | 400M bytes 19 hrs |

All with n = 10 centers.

An approximate estimate computation cost for the voters is described below. In accordance with the invention, the costly computations are mainly modular multiplication and modular exponentiation. Note that many modular exponentiations with the same base are being performed. This fact can be exploited by computing lookup tables that will reduce the number of multiplications required by the exponentiations. For example, it is possible to precompute $\alpha_j^i$ for all i's that are powers of 2. This will reduce the average number of multiplications needed to compute $\alpha_x$ mod p from $\frac{3}{2}$k, to $\frac{1}{2}$k, requiring a table size of $(n+2)k^2$ bits. Using a more sophisticated table can result in further factor of 3 for the typical number ranges.

Again consider the case of splitting m votes into n shares each. Splitting m votes to mn pieces requires $\frac{1}{2}$(n+2)km multiplications. A total of $\frac{1}{2}$(n+2)kl multiplications are needed for proving the reduction to the the reduced 2-share representation of a vote. A product of klm multiplications are needed to complete the proof that the votes are well formed. Verifying the subtallies of each center requires ($\frac{1}{2}$k+[# of voters])nm modular multiplications Altogether, the method requires approximately $$\frac{1}{2}[(2n+2+2l)m+)n+2)l]k+[\# \text{ of voters}]nm$$

modular multiplications. A PC running at 33 MHz can executes 768 multiplications in a second. Based on this, some of the resulting numbers are shown in Table 1.

Note that these figures are only approximate. However, the cost of the other modular addition or such operations as computing hash functions is comparatively negligible.

An approximate estimate of the computation cost needed for verification will now be described. Again, k is the length of p, and l is a security parameter which determines maximum probability of cheating. The value c is the length of coefficients used in the method which can be set small. Also, modular exponentiation can exploit the previously mentioned table lookup techniques.

Consider the case of splitting m votes into n shares each. The total $\frac{1}{2}$(n+2)|c|(m−1) multiplications are needed for generating the encryption of the shares, including their representation. The total $\frac{1}{2}$(n+2)(k+1)l multiplications are needed to verify that the combined equation is correct. The total (k+1)lm multiplications are needed to complete the proofs that the shares are well formed. Altogether, this yields $\frac{1}{2}[((n+2)|c|+2l(k−1))m+(n+2)(kl−l−|c|)]$ modular multiplications for each voter.

This number can be reduced by using techniques for verifying many modular exponentiations, resulting in a factor of 4 improvement over actually computing the exponentiations.

The work of Benaloh and Yung gave the first scheme where votes are divided into pieces and the verifiable subtally yields total outcome of voting. However, their scheme suffers from large communication complexity and seems not yet practical for implementation on existing networks. One of the reasons they need large communication complexity is that each centers i generate secret prime factors of their public key $N_i$. Therefore the scheme involves an interactive protocol to detect possible cheating at the setting of the public keys, together with an interactive protocol to show detected cheat was not due to a malicious voter. Also, since extra information of subtally may reveal these secret primes, an interactive protocol was necessary to prove the correctness of subtally. For the above reasons, their protocol needed $(4l^2+5l+2)kn$ bits for communication, where k is the size of the public keys of the n centers, and l is a security parameter.

The computation complexity is rather small for each iteration of their scheme, since the computation is based on $y^e x^r$ mod where e and r are much smaller than n. However, since this interactive proof takes place many times, the total cost does not remain so small. An estimate their total computation assuming that they use the same step of constructing a table of $y^i$ mod $n_j$ that requires nrk bits. Then, there will be $3(l^2+3l+1)\lg m+2(l^2+L+1)n+[\# \text{ of voters}]n$ bit modular multiplication in total, where k is the size of public keys of the n centers, r determines number of voters and l is a security parameter. An approximate numerical comparison is shown in Table 1.

Having described the method of practicing the present invention, preferred embodiments useful for practicing the invention will now be described.

Figure 4:
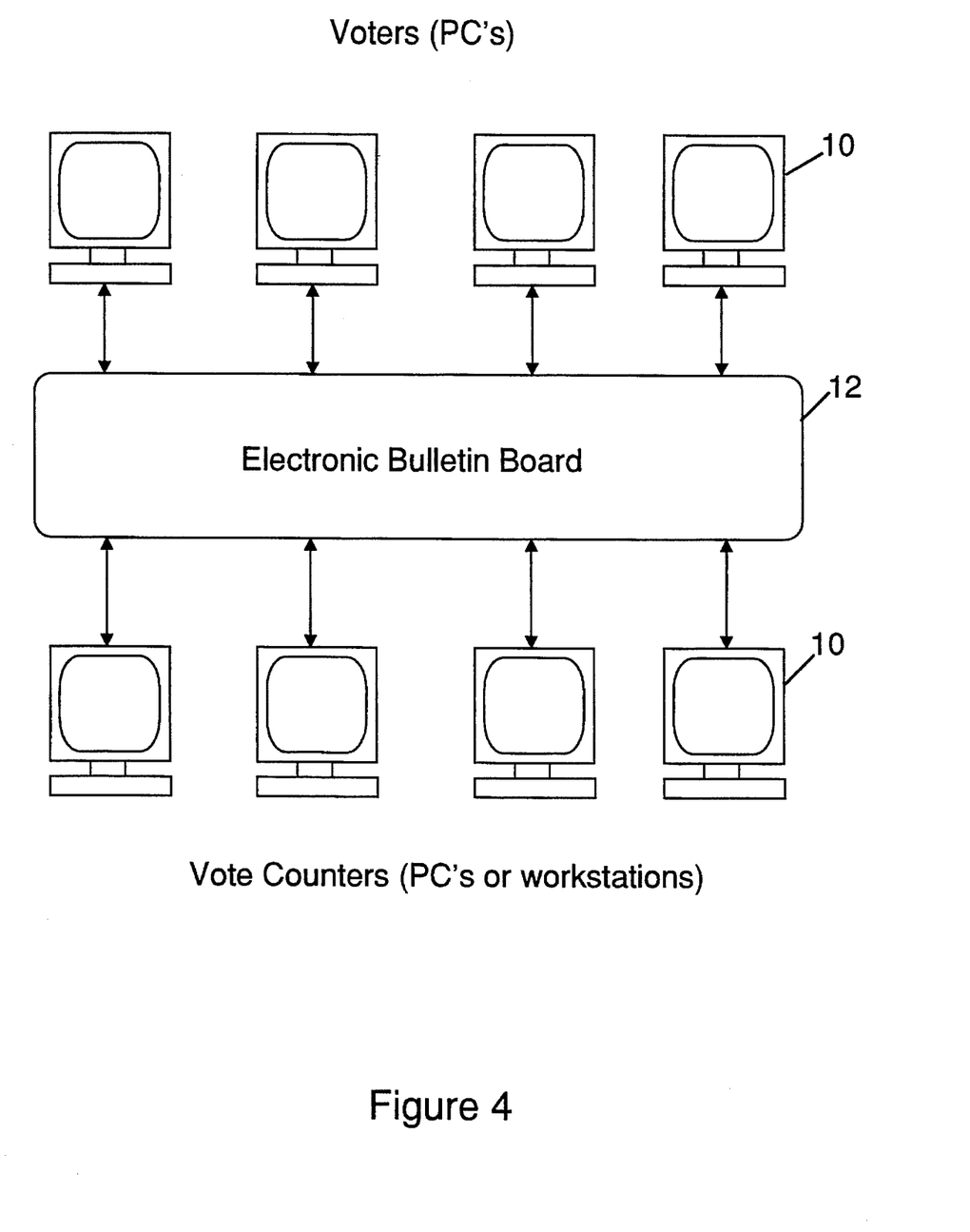
FIG. 4 is a schematic illustration of a preferred embodiment for practicing the invention.

FIG. 4 schematically illustrates a preferred embodiment for practicing the invention. The voters and vote counters use personal computers or workstations 10 connected to a conventional electronic bulletin board 12. All parties (voters, verifiers, counters and the like) to the voting process interact by posting messages to and sending messages from the bulletin board. Voters can also serve as vote counters. The personal computers either contain software to perform the method described above or alternatively contain in hardware or software embodiments of the elements described in FIGS. 5 to 9.

Figure 5:
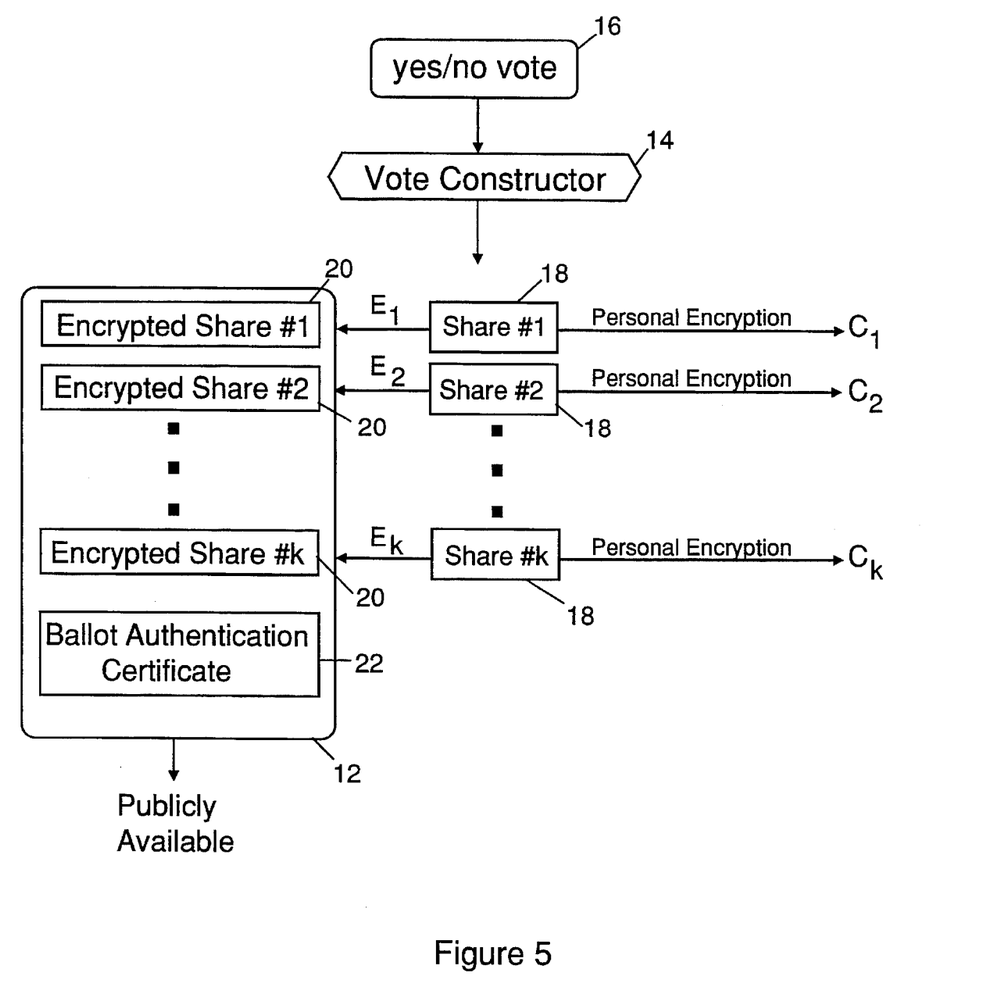
FIG. 5 is a schematic illustration of a vote constructor.

FIG. 5 illustrates a vote constructor. The vote constructor 14 generates shares 18 and encrypts the shams 20 for the vote from yes/no vote selection 16 using partially homomorphic encryption functions as described above. The vote constructor also encrypts the shares with the public key of the respective center $C_i$ that will process the share. The vote constructor also produces a ballot authentication certificate by which anyone can verify that the encrypted shares 10 combine to make a well-formed vote. The encrypted shares 20 and the certificate 22 are posted to the electronic bulletin board 12. The arrows to centers $C_i$ merely specify who is able to decrypt the globally posted information.

Figure 6:
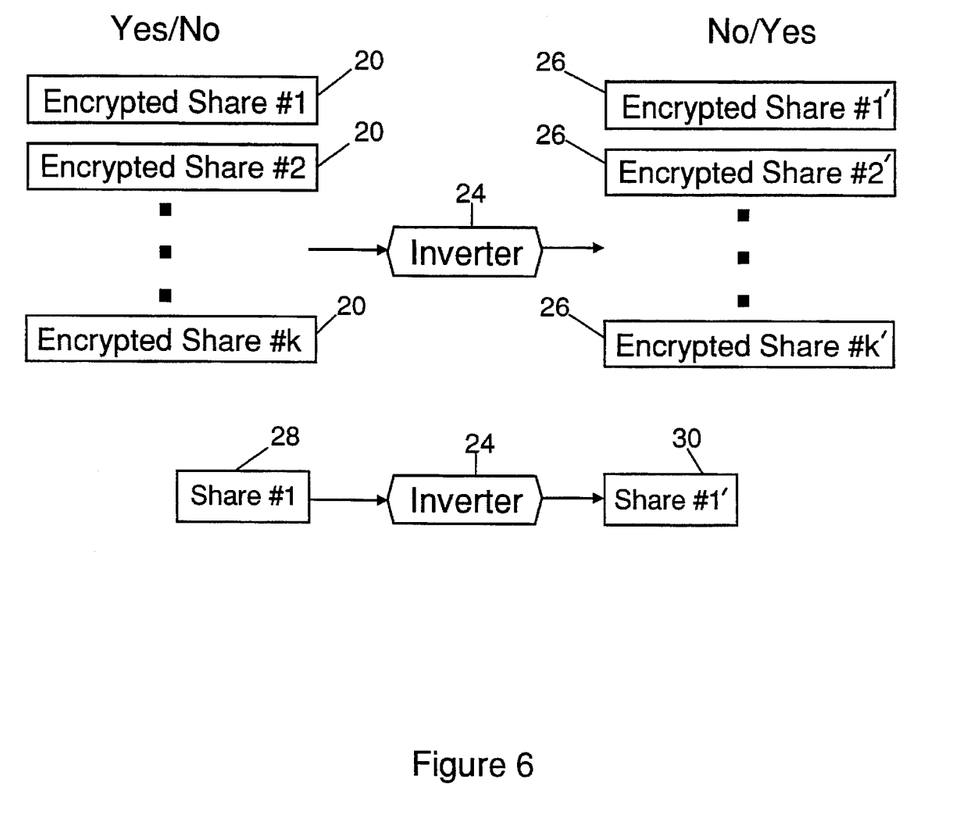
FIG. 6 is a schematic illustration of a vote inverter.

FIG. 6 schematically illustrates a vote inverter for converting "yes" votes to "no" votes and "no" votes to "yes" votes. (liven a set of encrypted shares 20, inverter 24 produces a set of encrypted shares 26 for the inverted vote (indicated with the prime), likewise, given an unencrypted share 28, inverter 24 will produce an inverted unencrypted share 30. During the actual voting, the voter specifies whether the previously constructed vote should be inverted before counting or be counted as is. A counter must conform to the specification of the voter or be detected as not conforming to the voter specification by anyone who checks the vote. The inverter enables the preprocessing of a vote, perhaps at the time of registration, and then allows subsequent voting by either confirming the preprocessed vote or inverting the preprocessed vote. This system enables more efficient voting.

Figure 7:
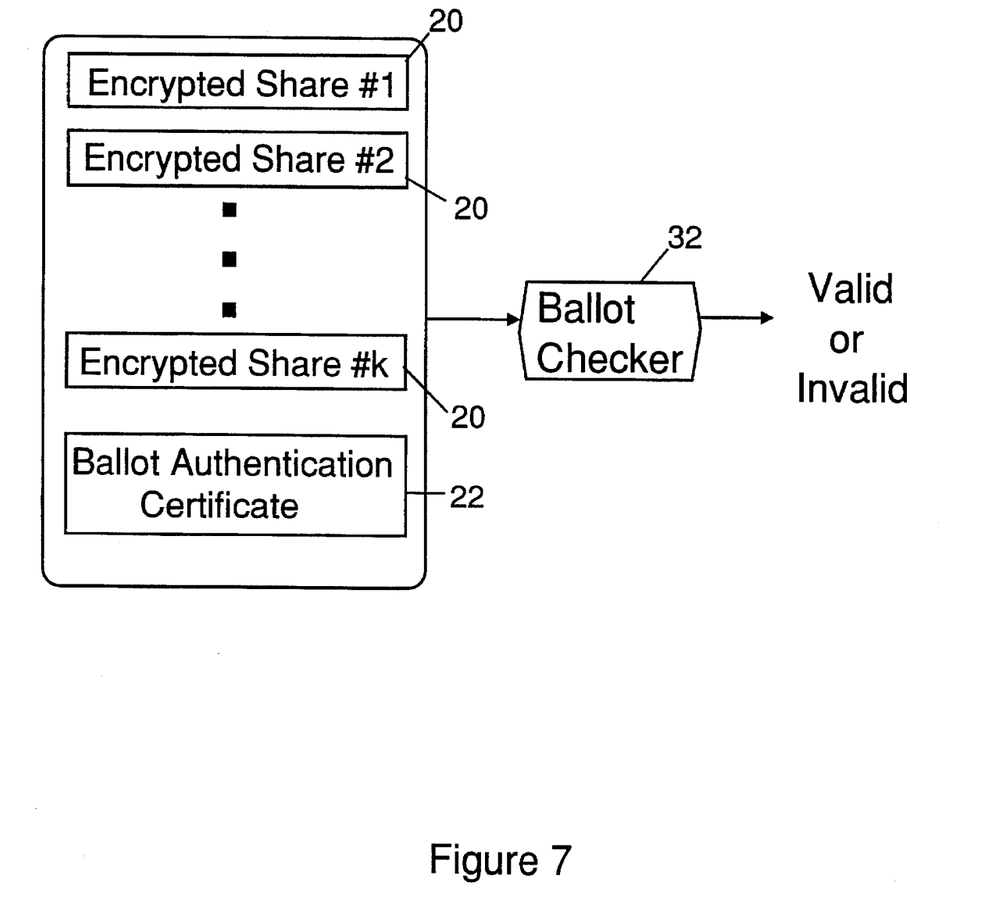
FIG. 7 is a schematic illustration of a ballot checker.

FIG. 7 schematically illustrates a ballot checker. The ballot checker 32 receives a set of encrypted shares 20 and the ballot authenticate certificate 22 and determines whether the encrypted shares can be combined to form a well-formed vote, thus indicating a valid or invalid vote.

Figure 8:
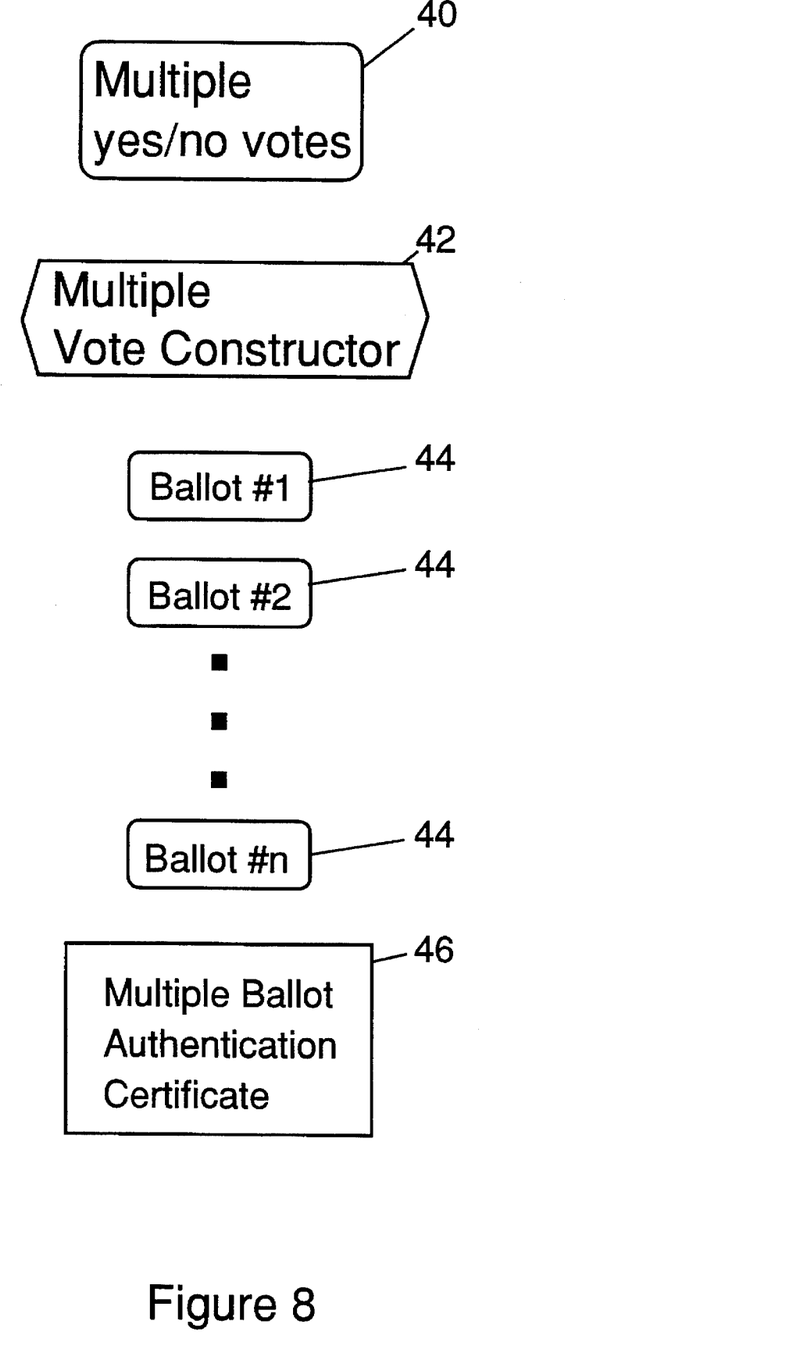
FIG. 8 is a schematic illustration of a multiple-vote constructor.

FIG. 8 schematically illustrates a multiple-vote constructor. In this case, a multiple yes/no vote selector 40 provides votes to a multiple vote constructor 42. The multiple vote constructor forms shares for each vote and encrypts the shares. Each encrypted vote is in the form of a ballot 44. A single multiple ballot authentication certificate 46 is provided for constructing all of the multiple votes.

Figure 9:
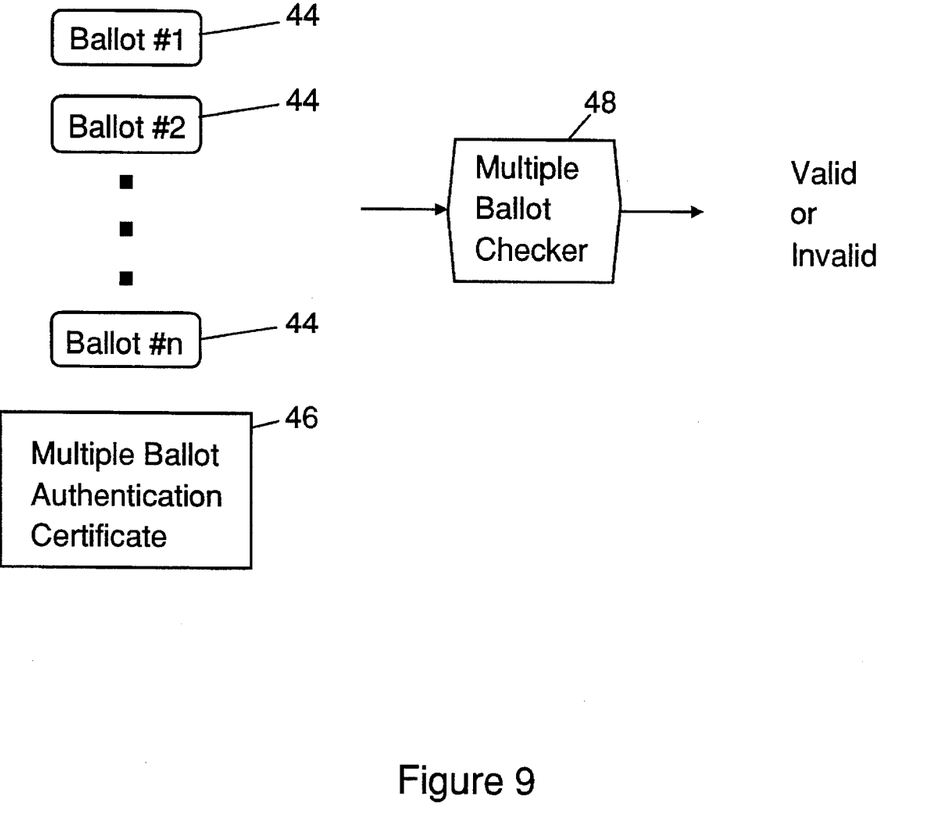
FIG. 9 is a schematic illustration of a multiple-vote ballot checker.

FIG. 9 schematically illustrates a multiple-vote ballot checker. A multiple ballot checker 48 checks a set of votes that were produced by the multiple vote constructor shown in FIG. 8. The checker 48 checks that a set of votes were produced by the multiple-vote constructor using the encrypted shares 44 and the single multiple ballot authentication certificate 46. As described in conjunction with the ballot checker in FIG. 7, the checker 48 determines whether the shares can be combined to form well-formed votes, thus indicating a valid or invalid vote.

Figure 10:
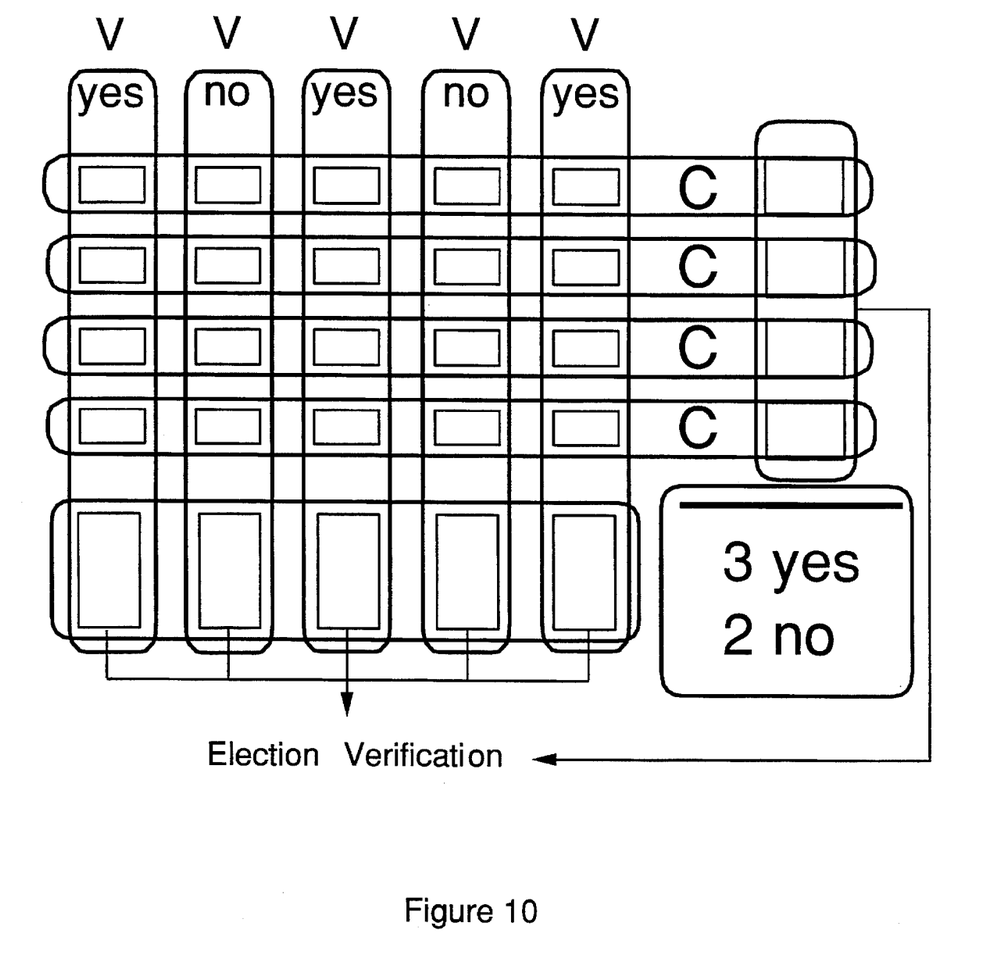
FIG. 10 illustrates the voting process in FIG. 3.

FIG. 10 graphically illustrates the voting process described in FIG. 3. Voter V cast votes "yes" or "no" as shown. The votes are broken into shares, encrypted and split among many centers C. The votes are checked with the certificates to provide proof that the votes were properly encrypted and distributed. The votes and centers verify the election. The centers combine their respective shares to form subtallies which are then combined together to yield the final election result.

While there has been described and illustrated a preferred method and apparatus of secure electronic voting, it will be apparent to those skilled in the art that variations and modifications are possible without deviating from the broad teachings and spirit of the present invention which shall be limited solely by the scope of the claims appended hereto.

What is claimed is:

1. A method of secure electronic voting with a plurality of voting means and a plurality of vote counting means using partially compatible homomorphisms comprising the steps of:

(a) choosing a randomly selected family of partially compatible encryption functions, $E_a, E_b\{E_i\}$, for voting means $V_1, V_2, \ldots, V_n$ and vote counting means $C_1, C_2, \ldots, C_n$ which functions are posted;

(b) each voting means $V_k$ randomly choosing masking votes, $v_{k,j} \in \{1,-1\}$ and then randomly choosing two representations for $v_{k,j}$: $v_{k,j} = X_{k,j}^{(1)} + X_{k,j}^{(2)} + \ldots + X_{k,j}^{(n)} = A_{k,j} + B_{k,j}$ and posting $E_i(X_{k,j}^{(i)}), E_a(A_{k,j})$ and $E_b(B_{k,j})$;

(c) reducing the equations in step (b) to $X^-{}_k^{(1)} + X^-{}_k^{(2)} + \ldots + X^-{}_k^{(n)} = A_k + B_k$, (d) proving the validity of the equation in step (c) by using prove-sum algorithm;

(e) executing algorithm prove±1, and (f) encrypting $X_{k,j}^{(i)}$ using $C_i$'s public encryption algorithm for all j and i and posting the encryptions.

2. A method of secure electronic voting as set forth in claim 1, further comprising the steps of:

(g) voting means k in order to use vote j, computing $s_{k,j} \in \{-1,1\}$ such that an actual vote is equal to $s_{k,j} v_{k,j}$, and posting $s_{k,j}$.

3. A method of secure electronic voting as set forth in claim 2 further comprising the steps of:

(h) each vote counting means $C_i$ decrypting $X_{k,j}^{(i)}$ for all k and j, and verifying whether it is consistent with $E_i(X_{k,j}^{(i)})$;

(i) each vote counting means $C_i$ calculating subtally $t^{(i)} = \Sigma_k s_k \cdot X_{k,j}^{(i)}$ and posting $t^{(i)}$, and (j) verifying that $\Pi_k (E_i(X_k^{(i)}))^{s_k}$ is equal to $E_i(t^{(i)})$.

4. A method of secure electronic voting as set forth in claim 3, further comprising the step of combining said subtallies.

5. A method of secure electronic voting as set forth in claim 2, further comprising the step of posting j.

6. A method of secure electronic voting as set forth in claim 1, where steps (c), (d) and (e) result in generating an authentication certificate.

7. A method of secure electronic voting as set forth in claim 6, where said generating comprises applying the Fiat-Shamir method.

8. A method of secure electronic voting as set forth in claim 6, further comprising the steps of:

(g) voting means k in order to use vote j, computing $s_{k,j} \in \{-1,1\}$ such that an actual vote is equal to $s_{k,j} v_{k,j}$, and posting $s_{k,j}$.

9. A method of secure electronic voting as set forth in claim 8, further comprising the steps of:

(h) each vote counting means $C_i$ decrypting $X_{k,j}^{(i)}$ for all k and j, and verifying whether it is consistent with $E_i(X_{k,j}^{(i)})$;

(i) each vote counting means $C_i$ calculating subtally $t^{(i)} = \Sigma_k s_k \cdot X_{k,j}^{(i)}$ and posting $t^{(i)}$, and (j) verifying that $\Pi_k (E_i(X_k^{(i)}))^{s_k}$ is equal to $E_i(t^{(i)})$.

10. A method of secure electronic voting as set forth in claim 9, further comprising the step of combining said subtallies.

11. A method of secure electronic voting as set forth in claim 8, further comprising the step of posting j.

12. A method of secure electronic voting with a plurality of voting means and a vote counting means using partially compatible homomorphisms comprising the steps of:

(a) choosing a randomly selected family of partially compatible encryption functions, $E_a$, $E_b\{E_i\}$ for voting means $V_1, V_2, \ldots V_n$ and vote counting means $C_1, C_2, \ldots C_n$, which functions are posted;

(b) each voting means $V_k$ randomly choosing a masking vote, $v_{k,j} \in \{1,-1\}$ and then randomly choosing two representations for $v_{k,j}$: $v_{k,j}=X_{k,j}^{(1)}+X_{k,j}^{(2)}+\ldots+X_{x,j}^{(n)}=A_{k,j}+B_{k,j}$;

(c) voting means k in order to use vote j, computing $s_{k,j} \in \{-1,1\}$ such that an actual vote is equal to $s_{k,j}v_{k,j}$, and posting $s_{k,j}$;

(d) each vote counting means $C_i$ calculating subtally $t^{(i)}=\Sigma_k s_k \cdot X_{k,j}^{(i)}$ and posting $t^{(i)}$; and (e) combining said subtallies for determining the outcome of the voting.

13. An apparatus for secure electronic voting using partially compatible homomorphisms comprising:

a plurality of voting means and a plurality of vote counting means, each having a randomly selected family of partially compatible encryption functions, $E_a$, $E_b\{E_i\}$ which are posted on a publicly accessible media;

each voting means randomly choosing masking votes, $v_{k,j} \in \{1,-1\}$ and randomly choosing two representations for $v_{k,j}$; $v_{k,j}=X_{k,j}^{(1)}+X_{k,j}^{(2)}+\ldots+X_{k,j}^{(n)}=A_{k,j}+B_{k,j}$ and posting $E_i(X_{k,j}^{(i)})$, $E_a(A_{k,j})$ and $E_b(B_{k,j})$ on said publicly accessible media;

means for reducing the equations for $v_{k,j}$ to the form $X^-{}_k^{(1)}+X^-{}_k^{(2)}+\ldots+X^-{}_k^{(n)}=\bar{A}_k+\bar{B}_k$;

means for proving the validity of $v_{k,j}$ using prove-sum algorithm;

means for executing algorithm±1;

means for encrypting $X_{k,j}^{(i)}$ using said partial encryption function for all j and i and posting the encryptions on said publicly accessible media.

14. An apparatus for secure electronic voting as set forth in claim 13, further comprising:

means for computing $s_{k,j} \in \{1,-1\}$ such that an actual vote is equal to $s_{k,j}v_{k,j}$ and posting $s_{k,j}$ on said publicly accessible media where k is one of said plurality of voting means and j is a vote.

15. An apparatus for secure electronic voting as set forth in claim 14, further comprising:

means associated with each of said vote counting means for decrypting $X_{k,j}^{(i)}$ for all k and j, and verifying whether it is consistent with $E_i(X_{k,j}^{(i)})$;

means associated with each of said vote counting means for calculating a subtally $t^{(i)}=\Sigma_k s_k \cdot X_{k,j}^{(i)}$ and posting $t^{(i)}$ on said publicly accessible media; and means for verifying that $\Pi_k(E_i(X_k^{(i)}))^{s_k}$ is equal to $E_i(t^{(i)})$.

16. An apparatus for secure electronic voting as set forth in claim 14, further comprising means for posting j on said publicly accessible media.

17. An apparatus for secure electronic voting as set forth in claim 13, where said vote counting means and said voting means comprise a personal computer and said publicly accessible media comprises an electronic bulletin board.

18. An apparatus for secure electronic voting as set forth in claim 13, further comprising means for generating an authentication certificate.

19. An apparatus for secure electronic voting as set forth in claim 18, where said means for generating includes means for applying the Fiat-Shamir method.

20. An apparatus for secure electronic voting as set forth in claim 18, further comprising:

means for computing $s_{k,j} \in \{1,-1\}$ such that an actual vote is equal to $s_{k,j}v_{k,j}$ and posting $s_{k,j}$ on said publicly accessible media where k is one of said plurality of voters and j is a vote.

21. An apparatus for secure electronic voting as set forth in claim 20, further comprising:

means associated with each of said vote counting means for decrypting $X_{k,j}^{(i)}$ for all k and j, and verifying whether it is consistent with $E_i(X_{k,j}^{(i)})$;

means associated with each of said vote counting means for calculating a subtally $t^{(i)}=\Sigma_k s_k \cdot X_{k,j}^{(i)}$ and posting $t^{(i)}$ on said publicly accessible media; and means for verifying that $\Pi_k(E_i(X_k^{(i)}))^{s_k}$ is equal to $E_i(t^{(i)})$.

22. An apparatus for secure electronic voting as set forth in claim 20, further comprising means for posting j on said publicly accessible media.

23. An apparatus for secure electronic voting as set forth in claim 18, where said vote counting means and said voting means comprise a personal computer and said publicly accessible media comprises an electronic bulletin board.

24. An apparatus for secure electronic voting using partially compatible homomorphisms comprising:

a plurality of voting means and a plurality of vote counting means, each having a randomly selected family of partially compatible encryption functions $E_a$, $E_b\{E_i\}$ which are posted on a publicly accessible media;

each voting means randomly choosing a masking vote, $v_{k,j} \in \{1,-1\}$ and randomly choosing two representations for $v_{k,j}$: $v_{k,j}=X_{k,j}^{(1)}+X_{k,j}^{(2)}+\ldots+X_{k,j}^{(n)}=A_{k,j}+B_{k,j}$ and posting $E_i(X_{k,j}^{(i)})$, $E_a(A_{k,j})$ and $E_b(B_{k,j})$ on said publicly accessible media;

means for computing $s_{k,j} \in \{-1,1\}$ such that an actual vote is equal to $s_{k,j}v_{k,j}$, and posting $s_{k,j}$ on said publicly accessible media, where k is one of said plurality of voters and j is a vote;

means associated with each of said vote counting means for decrypting $X_{k,j}^{(i)}$ for all k and j, and verifying whether it is consistent with $E_i(X_{k,j}^{(i)})$;

means associated with each of said vote counting means for calculating a subtally $t^{(i)}=\Sigma_k s_k \cdot X_{k,j}^{(i)}$ and posting $t^{(i)}$ on said publicly accessible media; and means for combining said subtallies for determining the outcome of said voting.

25. An apparatus for secure electronic voting as set forth in claim 24, where said vote counting means and said voting means comprise a personal computer and said publicly accessible media comprises an electronic bulletin board.

26. An apparatus for secure electronic voting as set forth in claim 24, further comprising means for generating an authentication certificate.

27. An apparatus for secure electronic voting as set forth in claim 26, where said means for generating includes means for applying the Fiat-Shamir method.

28. An apparatus for secure electronic voting as set forth in claim 26, where said vote counting means and said voting means comprise a personal computer and said publicly accessible media comprises an electronic bulletin.

* * * * *